(12) United States Patent
Cummins et al.

(10) Patent No.: US 6,382,952 B1
(45) Date of Patent: *May 7, 2002

(54) ROUNDER BAR FOR PROCESSING BAKERY DOUGH

(76) Inventors: Chris Cummins, 11184 Hopson Rd., Ashland, VA (US) 23005; Sam Seiling, 2307 Viking La., Richmond, VA (US) 23228

(*) Notice: Subject to any disclaimer, the term of this patent is extended or adjusted under 35 U.S.C. 154(b) by 0 days.

This patent is subject to a terminal disclaimer.

(21) Appl. No.: 09/570,008

(22) Filed: May 12, 2000

Related U.S. Application Data

(62) Division of application No. 09/009,719, filed on Jan. 20, 1998, now Pat. No. 6,123,537.

(51) Int. Cl.[7] .............................. A21C 11/00; A21C 3/02
(52) U.S. Cl. ........................ 425/332; 425/333; 426/469; 426/512; 249/115
(58) Field of Search ................................ 425/332, 333; 426/496, 512; 249/115

(56) References Cited

U.S. PATENT DOCUMENTS

| | | | | |
|---|---|---|---|---|
| 4,008,025 A | * | 2/1977 | Campbell | 425/332 |
| 4,306,850 A | * | 12/1981 | Cummins | 425/332 |
| 5,714,178 A | * | 2/1998 | Keener | 425/333 |
| 5,786,016 A | * | 7/1998 | Campbell et al. | 426/512 |
| 6,159,517 A | * | 12/2000 | Watts et al. | 425/332 |

FOREIGN PATENT DOCUMENTS

| | | | | |
|---|---|---|---|---|
| DE | 1098881 | * | 2/1961 | |
| GB | 291692 | * | 6/1928 | 425/364 |

* cited by examiner

*Primary Examiner*—Nam Nguyen
*Assistant Examiner*—Thu Khanh T. Nguyen
(74) *Attorney, Agent, or Firm*—Duane Morris LLP

(57) ABSTRACT

A rounder bar for shaping pieces of baking dough advancing upon a conveyor belt has an elongated configuration having top and rear surfaces and an arcuate dough-contacting surface of convex contour with respect to the top and rear surfaces. The dough-contacting surface is provided with a non-occluding texture which minimizes adherence of the dough.

16 Claims, 2 Drawing Sheets

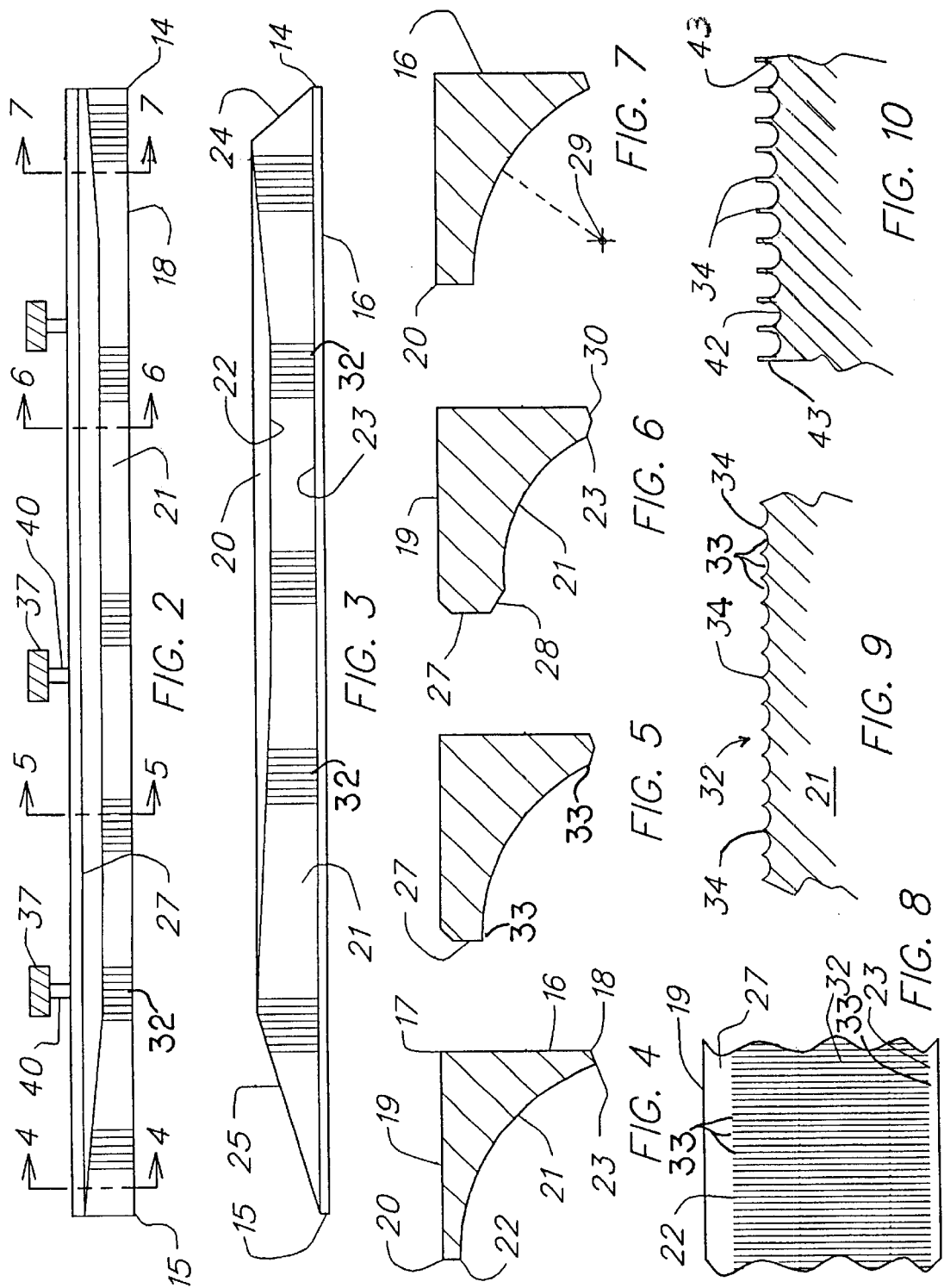

ROUNDER BAR FOR PROCESSING BAKERY DOUGH

This application is a division of application Ser. No. 09/009,719, filed Jan. 20, 1998, now U.S. Pat. No. 6,123,537.

BACKGROUND OF THE INVENTION

1. Field of the Invention

This invention relates to the handling of dough for baking, and more particularly concerns apparatus for dispensing successive pieces of dough of uniform shape.

2. Description of the Prior Art

Methods and apparatus for pumping, homogenizing and dividing bakery dough into pieces of predetermined uniform weight for baking into bread loaves, buns, rolls and the like are disclosed in U.S. Pat. Nos. 4,960,601; 4,517,212; 4,449,908; 4,424,236; 4,332,538; 4,948,611; and 5,046,940. In general, such apparatus includes a hopper which receives dough, auger means for advancing the dough, metering means which control the advance of the dough, nozzles which receive the metered dough, and cutting means which sever the continuously advancing dough into discrete pieces that fall onto an underlying moving belt.

The number of pieces of dough that fall onto the belt in laterally spaced array usually corresponds to the number of nozzles. However, in some instances a positioner device may be utilized to distribute pieces of dough emergent from a single nozzle onto different positions transverse to the direction of belt travel. Therefore, the number of sites at which pieces of dough are initially disposed upon the belt in lateral array may be greater than the number of nozzles. The several laterally spaced pieces of dough, in longitudinal sequence, constitute separate lines of dough pieces.

The pieces of dough, initially having an irregular shape with protruding portions, are subjected to a shaping treatment which rounds the pieces. The rounding is usually produced by elongated stationary bars extending upwardly from sliding contact with the belt surface and oriented on a bias relative to the direction of belt movement. The bars have an arcuately shaped contact surface, and produce a curling effect as the piece of dough is propelled by the belt in rolling contact with the arcuate surface. Such dough shaping apparatus, generally referred to as a "rounder" or "rounder bar" is disclosed, for example, in U.S. Pat. No. 4,306,850 to Cummins. Although such rounder bars are very effective, there is a tendency for the dough to stick to the surface of the rounder bar.

The sticking or adhering effect at the rounder bar sometimes causes fragments to be torn from the dough pieces. Also, if a piece is slowed in its travel upon the rounder bar because of the sticking effect, the next subsequent piece of dough may catch up with and integrate with the slower preceding piece. Efforts to alleviate the sticking effect generally involve the periodic or continuous spraying of release agents such as food-compatible oils. However, such oils adversely affect the aesthetic appearance of the final baked products, and produce accumulations which engender cleaning problems.

It is accordingly an object of the present invention to provide an improved rounder bar for a dough processing apparatus.

It is another object of this invention to provide a rounder bar as in the foregoing object having diminished sticking affinity for dough.

It is a further object of the present invention to provide a rounder bar of the aforesaid nature which is easily serviceable for maintenance and cleaning purposes.

It is a still further object of this invention to provide a rounder bar of the aforesaid nature of durable construction amenable to low cost manufacture.

These objects and other objects and advantages of the invention will be apparent from the following description.

SUMMARY OF THE INVENTION

The above and other beneficial objects and advantages are accomplished in accordance with the present invention by a rounder bar for shaping pieces of bakery dough advancing upon a flat conveyor belt, said rounder bar having an elongated configuration terminating in upstream and downstream ends, and further having:

a) a rear surface bounded by upper and lower edge extremities, b) a top surface bounded by a forward edge and a rear edge coincident with the upper edge of said rear surface, and c) an arcuate dough-contacting surface of convex contour in relation to said rear and top surfaces, said arcuate surface extending between a front boundary adjacent the forward edge of said top surface and a back boundary adjacent the lower edge extremity of said rear surface, said arcuate surface containing non-occluding texture means.

In preferred embodiments, the rounder bar is a monolithic structure fabricated of a machinable, moldable polymer having a low surface energy which resists adhesive attachments.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing:

FIG. 2 is a side view of the embodiment of rounder bar of FIG. 1.

FIG. 3 is a bottom view.

FIGS. 4, 5, 6 and 7 are enlarged sectional views taken upon the lines 4—4, 5—5, 6—6 and 7—7, respectively, in FIG. 2.

FIG. 8 is a greatly enlarged fragmentary view of the arcuate surface component of the embodiment of FIG. 1.

FIG. 9 is a profile view of the arcuate surface of FIG. 8.

FIG. 10 is a profile view of an alternative groove configuration.

DESCRIPTION OF THE PREFERRED EMBODIMENT

Figure 1:
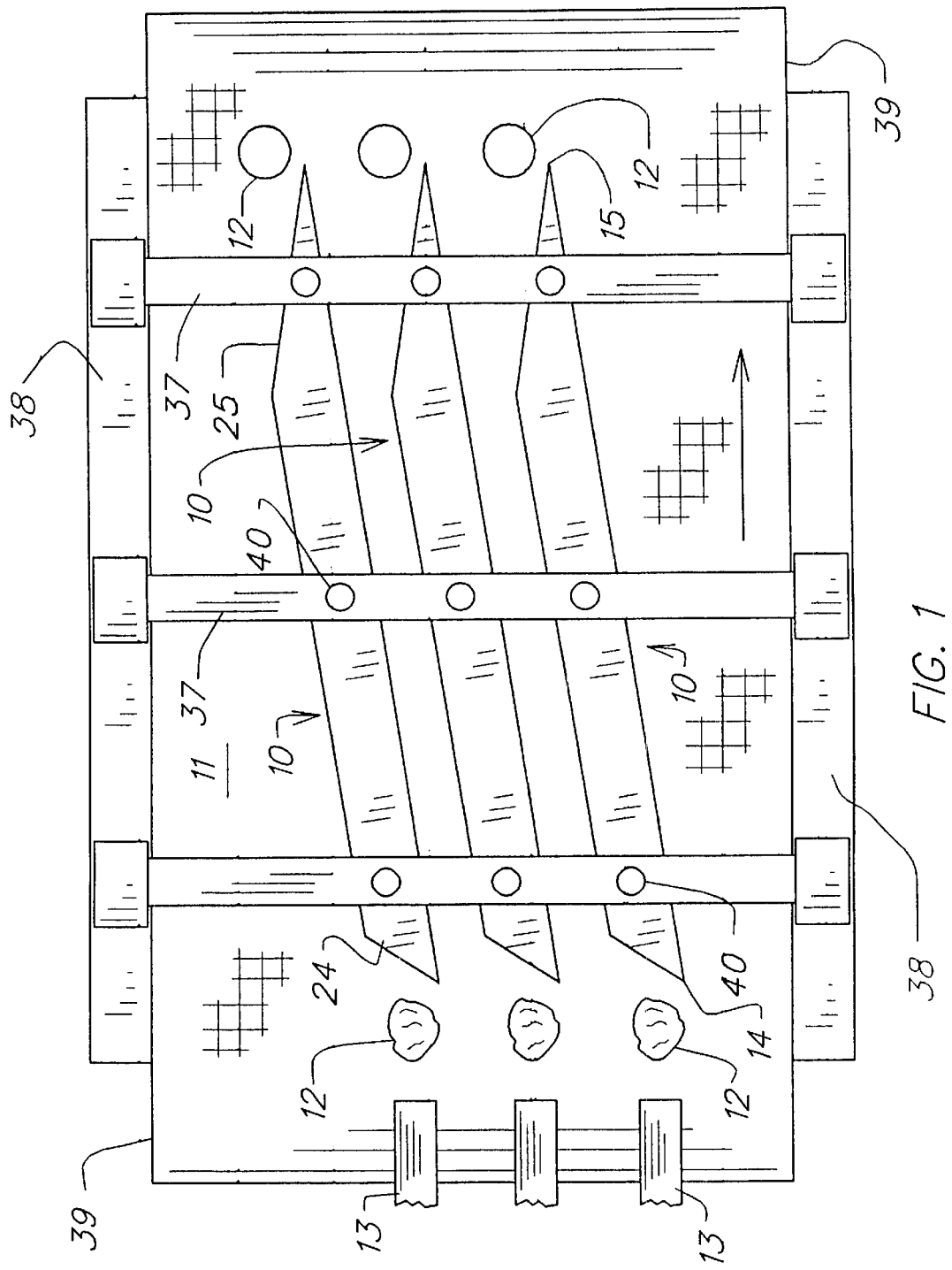
FIG. 1 is a top view of an array of several units of an embodiment of the rounder bar of the present invention shown in operative association with pieces of bakery dough being advanced upon a moving belt.

Referring now to FIGS. 1–9, three identical units of an embodiment of a rounder bar 10 of the present invention are shown operationally positioned upon a horizontally disposed endless conveyor belt 11 moving in the direction shown by the arrowed line, and acting upon several pieces of dough 12, said pieces of dough having been emergent from nozzles 13. Said rounder bars are secured by bolts 40 to overhead transverse beams 37 supported by stationary paired apron strips 38 adjacent the laterally opposed belt edges 39.

Rounder bar 10 is exemplified as a monolithic structure fabricated from a moldable, machinable plastic of low surface energy such as ultra high molecular weight polyethylene. Suitable low surface energy polymers are those wherein the wetting angle of a drop of water resting upon a horizontal flat surface of the polymer is greater than 90 degrees. Low wettability or low adhesive affinity of the polymer surface is desirable in order to minimize unwanted adhesion of dough to the rounder bar. Although proper polymer selection can achieve some minimization of adhesive attachment of the dough, further measures are necessary, as will be described hereinafter.

Rounder bar 10 has an elongated configuration, terminating in upstream and downstream ends 14 and 15, respectively, and further having a flat rear surface 16 bounded in part by upper and lower edge extremities 17 and 18, respectively. A flat top surface 19 is bounded in part by forward edge 20 and a rear edge which is coincident with upper edge 17 of rear surface 16. Although rounder 10 is exemplified as being elongated upon a straight axis, it is conceivable that certain embodiments may be gently curved in a path parallel to said top surface. Upstream end 14 may be provided with a tapered in-feed zone 24. Downstream end 15 may be provided with a tapered exit zone 25.

An arcuate dough-contacting surface 21 having a convex contour in relation to said rear and top surfaces extends between a front boundary 22 adjacent forward edge 20 of said top surface, and back boundary 23 adjacent lower edge 18 of said rear surface. As shown in FIGS. 4–7, the nature of the curvature of arcuate surface 21 may vary in the course of its extension along the rounder. In the exemplified embodiment, the initial curvature, as shown in FIG. 4, is characterized in having its front boundary 22 close to top surface 19. In the subsequent curvature configurations, shown in FIGS. 5 and 6, said front boundary is successively lowered away from top surface 19. Then, near downstream end 15, the front boundary 22 of the arcuate surface is raised closer to said top surface 19.

The portion of the rounder disposed between top surface 19 and arcuate surface 21 adjacent forward edge 20 may be referred to as a lip portion, terminating in front sidewall 27 disposed in parallel juxtaposition with rear surface 16. By virtue of the aforesaid varying elevation of the front boundary of said arcuate surface, the vertically measured width of said front sidewall will vary. A chamfer surface 28 may be disposed between front sidewall 27 and arcuate surface 21.

The nature of the curvature of arcuate surface 21 is substantially uniform along the length of the rounder, said curvature being approximately circular, convex with respect to said rear and top surfaces, and accordingly concave with respect to the dough pieces 12. The contour of surface 21 is such as to form with said belt a pocket that accommodates the dough pieces. The curvature of surface 21 may be further characterized in that the center 29 of said curvature is located below lower edge extremity 18 and displaced inwardly from forward edge 20 toward rear surface 16.

A footing surface 30 is disposed between the lower edge extremity 18 of rear surface 16 and back boundary 23 of arcuate surface 21. Said footing surface functions to maintain light contacting force upon the belt.

In order to minimize the adhesion of dough pieces upon arcuate surface 21, said surface is provided along its entire length with non-occluding texture means for reducing the effective area that contacts said dough pieces. In the illustrated preferred embodiment, said texture means is in the form of a series of parallel identical grooves 32 extending in planes orthogonal to said rear and top surfaces. It is important to note that each groove terminates in opposed open extremities 33. Accordingly, there is no occlusion or dead end space associated with the grooves capable of trapping particles of dough. As employed herein, the terms "occlusion" and "occluding" are intended to denote a depression which, in horizontal orientation, is capable of confining a liquid such as water. The preferred groove configuration enables the rounder to be periodically washed with water to remove all traces of dough. If, on the contrary, the texture means incorporated pockets, dead ends or other occlusions defined by a bottom surface and surrounding surface, particles of dough entrapped therein would be very difficult to remove during normal cleaning operations.

It has been found that bakery dough, inherently having a very tacky consistency which causes it to adhere to almost all surfaces, has a secondary mechanism of adhesions which involves the formation of a vacuum at a contacting surface. Such vacuum resists removal of the dough, causing cohesive failure of the dough substrate, and thereby leaving pieces of dough on the contacted surface. The aforesaid preferred groove structure which has no closed ends has been found of further benefit in minimizing dough adhesion by providing air access to the interface of the dough and rounder bar surface. Such air access overcomes the effects of the vacuum mechanism of adhesion.

The groove structure of the exemplified embodiment is such as to provide intervening ridges or lands 34 that constitute the residual contact area of surface 21. It has been found that effective minimization of dough sticking is achieved when the residual contact area is less than 50% of the total geometrically measured area of surface 21. Adjustment of the total residual contact area may be achieve by minimizing the width of lands 34. It has also been found that the depth of grooves 32 should be between 0.005 and 0.015 inch to achieve effectiveness in reducing adhesion without capturing pieces of dough. In preferred embodiments, there will be between 40 and 100 grooves per inch. i.e. the grooves will have a width of about 0.01 inches to 0.25 inches. Thus, in the preferred embodiment the ratio of width to height of the grooves may be calculated to be in the range of about 1:1 to 5:1, i.e. 0.01/0.015 to 0.025/0.005.

It has been found that, in order to avoid entrapment of microscopic pieces of dough, the grooves should preferably have a rounded contour, as shown in FIG. 9, in which case the intervening lands will be in the form of pointed apices of cusp-like contour. Although the width of the cusp-like lands is difficult to measure, it is estimated the degree of reduction of contact area, namely the amount of original area removed from surface 21, is greater than 90%. Alternative texture means may be employed which provide similar reduction in effective contact surface without creating occlusive pockets. The texture means may be alternatively characterized as providing a surface finish between 63 and 125.

In the alternative groove configuration shown in FIG. 10, the bottom or valley 42 of the grooves is curved and the associated opposed sidewalls 43 are straight, thereby producing a U-shaped contour. The intervening lands 34 are flat and disposed in the original, uncut contact surface 21. In order to achieve the non-sticking and non-occluding advantages of the rounder bar of the present invention, it is preferable that the ratio of the width of the groove, measured between its sidewalls, to the height of the groove, measured between valley 42 and land 34, be between 1:1 and 2:1. Also, the width of lands 34, measured between the sidewalls of contiguous grooves, should be less than half the width of the grooves, measured between the opposing sidewalls of each groove.

A metal bracket bar of L-shape may be attached to the top and rear surfaces of rounder 10 for the purpose of enhancing rigidity and facilitating releasible and adjustable securement to conventional support structure generally disposed above belt 11.

While particular examples of the present invention have been shown and described, it is apparent that changes and modifications may be made therein without departing from the invention in its broadest aspects. The aim of the appended claims, therefore is to cover all such changes and modifications as fall within the true spirit and scope of the invention.

Having thus described our invention, what is claimed is:

1. A rounder bar adapted to be positioned in sliding contact with a flat belt conveyor at an angle with respect thereto so that individual pieces of dough traveling along the flat belt conveyor contact an elongated, generally arcuate surface of the rounder bar and are forced by such contact to move laterally across the flat belt conveyor as they are carried thereby, the simultaneous contact of the dough with the flat belt conveyor and said generally arcuate surface applying a force with a component lateral to the direction of travel of the dough to thereby round the pieces of dough, said elongated, generally arcuate surface comprising a plurality of spaced apart, parallel lands, each of said lands being substantially disposed in a plane extending generally across along the length of the rounder bar and substantially normal to the flat belt conveyor, the width of each of said lands being no greater than the spacing between adjacent ones of said lands, and said lands being sufficiently close together and having a height sufficient to collectively support a piece of dough substantially out of contact with the rounder bar intermediate said lands as the individual piece of dough travels along the flat belt conveyor in contact with said arcuate surface, to thereby reduce the tendency of the pieces of dough traveling along the flat belt conveyor to adhere to the rounder bar in the absence of a layer of edible oil on said arcuate surface.

2. The rounder bar of claim 1 wherein the width of each of said lands is less than about 50% of the spacing between adjacent ones of said lands.

3. The rounder bar of claim 1 wherein the spacing between adjacent ones of said lands being in the range of about 1 to about 5 times the height of said lands.

4. In a rounder bar having an arcuate surface for shaping pieces of bakery dough advancing upon a flat conveyor belt where the rounder bar is positioned at an angle with respect to the direction of travel of the conveyor belt, the improvement comprising a textured surface on the arcuate surface for releasably gripping the dough without adhesion thereto, said textured surface comprising a series of lands and grooves substantially parallel to each other and oriented in a plane substantially perpendicular to the length of the rounder bar so that pieces of dough traveling on the flat conveyor and in contact with said textured surface along the length of the rounder bar cross said lands and grooves in a direction substantially perpendicular to the orientation of said land and grooves, whereby the area of said textured surface contacting the dough is less than approximately 50% of the arcuate surface.

5. The rounder bar of claim 4 wherein the width of each of said lands is less than about 50% of the width of each of said grooves.

6. In a rounder bar having a substantially smooth arcuate surface for shaping pieces of bakery dough advancing upon a flat conveyor belt where the rounder bar is positioned at an angle with respect to the direction of travel of the conveyor belt, a method of reducing the adhesive attachment of dough to the arcuate surface comprising the steps of:

forming a series of substantially parallel lands and grooves in the smooth arcuate surface in an orientation substantially perpendicular to the length of the rounder bar, the lands collectively forming a dough contacting surface and the grooves collectively forming a surface recessed from the dough contacting surface whereby the area of the dough contacting surface is less than about 50% of the area of the smooth arcuate surface, the ratio of the width of the grooves to the height of the grooves being in the range of about 1:1 to 5:1 to thereby substantially obviate contact of the dough with the recessed surface.

7. In a rounder bar having a generally arcuate surface for shaping pieces of bakery dough advancing upon a flat conveyor belt, where the rounder bar is positioned at a angle with respect to the direction of travel of the conveyor belt, said arcuate surface comprising:

a series of substantially parallel grooves oriented substantially perpendicular to the length of the rounder bar, each groove comprising a bottom valley and opposing side walls and being open on both ends, whereby the portion of the arcuate surface connecting the adjacent sidewalls of adjacent grooves forms a series of substantially parallel lands oriented in a plane substantially perpendicular to the length of the rounder bar so that the direction of travel of the dough pieces along the rounder bar is substantially perpendicular to the orientation of the lands, said series of lands collectively forming an arcuate dough contacting surface having an area less than approximately 50% of the arcuate surface.

8. The rounder bar of claim 7 wherein the width of each of said lands is less than about 50% of the width of each of said grooves.

9. The rounder bar of claim 8 wherein said lands are in the form of pointed apices of cusp-like contour.

10. The rounder bar of claim 9 wherein the ratio of the width of said groove, measured between adjacent apices, to the height of the groove, measure orthogonally between said valley bottom and apices, is between 1:1 and 5:1.

11. A rounder bar positioned at an angle with respect to the direction of travel of a flat conveyor belt for shaping pieces of bakery dough advancing upon the flat conveyor belt and in contact with the rounder bar as the dough travels in a direction along the length of the rounder bar comprising:

an arcuate surface between a top and rear surface forming a pocket between said arcuate surface and the conveyor belt, said arcuate surface tapered at the upstream and downstream ends of the rounder bar, said arcuate surface containing a series of lands and grooves substantially parallel to each other and oriented in a plane substantially perpendicular to the length of the rounder bar so that the direction of travel of the dough along the length of the rounder bar is substantially perpendicular to the orientation of the lands and grooves, said lands collectively forming the dough contact area of said arcuate surface, and said grooves collectively forming a recess in said arcuate surface, said dough contact area being less than about 50% of the arcuate surface; and a frame attached to at least one of said top and rear surfaces for positioning the rounder bar in slidable contact with the conveyor at an angle to the direction of travel of the conveyor on which positioned.

12. A rounder bar for use in cooperation with a flat conveyor to shape dough pieces as the dough pieces travel on the conveyor where the rounder bar is positioned at an angle with respect to the direction of travel of the conveyor comprising:

a top surface oriented in a plane substantially parallel to the plane of the conveyor;

a rear surface adjacent to the top surface and oriented in a plane substantially perpendicular to the plane of the conveyor;

an arcuate surface intermediate with said top and rear surfaces and convex with respect to said top and rear surfaces, to thereby form with the conveyor an elongated pocket through which the dough pieces travel in contact with said arcuate surface, said arcuate surface containing a series of substantially parallel grooves and lands oriented in a plane substantially perpendicular to the length of the rounder bar so that the direction of travel of the dough pieces is substantially perpendicular to the orientation of the grooves and lands, said lands collectively forming a dough contacting surface and said grooves collectively forming a recessed surface so that the dough traveling along the rounder bar remains in contact with said dough contacting surface to the substantial exclusion of said recessed surface; and a frame attached to said top and rear surfaces to maintain the rounder bar in sliding contact with the conveyor.

13. In a rounder bar positioned at an angle with respect to a flat conveyor belt and having an arcuate surface for shaping pieces of bakery dough advancing upon the flat conveyor belt and along the length of the rounder bar, a method of reducing the portion of the arcuate surface which comes in contact with the dough and thus the tendency of adherence of the dough to the surface comprising the step of removing more than approximately 50% of the arcuate surface with which the dough comes in contact.

14. The method of claim 13 wherein the step of reducing comprises removing portions of the arcuate surface by forming a series of grooves in the arcuate surface in a plane substantially parallel to each other and substantially perpendicular to the length of the rounder bar to thereby form a series of lands intermediate to the grooves, said lands collectively forming the dough contacting surface of the rounder bar.

15. A rounder bar having an arcuate surface for shaping pieces of bakery dough advancing upon a flat conveyor belt where the rounder bar is positioned at an angle to the direction of travel of the conveyor belt, comprising a series of substantially parallel lands and grooves oriented substantially perpendicular to the length of the rounder bar, each groove comprising a bottom valley and opposing side walls and being open on both ends, the ratio of the width of said grooves, measured between opposing side walls, to the height of the grooves, measured orthogonally between the valley bottom and the top of the opposing sidewalls, being in the range of about 1:1 to 5:1, said lands collectively forming a dough contacting area having less than about 50% of the area of the arcuate surface so that pieces of dough traveling on the flat conveyor belt in contact with said arcuate surface along the length of the rounder bar cross said lands and grooves in a direction substantially perpendicular to the orientation of said lands and grooves to thereby obviate contact of the dough with the bottom valley of said grooves and thereby reduce the tendency for adhesive attachment of the dough pieces to the arcuate surface.

16. The rounder bar of claim 15 wherein the width of each of said lands is less than about 50% of the width of each of said grooves.

\* \* \* \* \*